Figure 1:
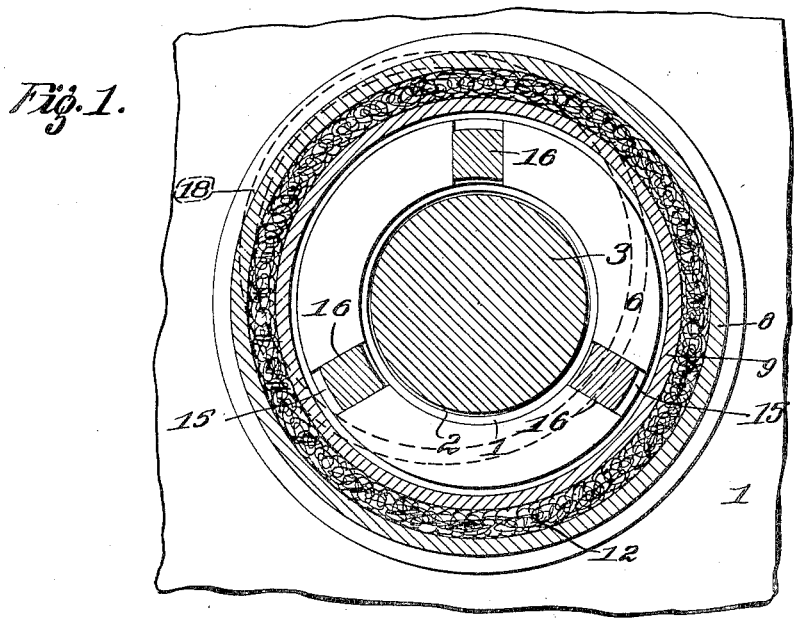

W. G. E. ROLAFF.
PACKING RING FOR ROTARY SHAFTS.
APPLICATION FILED DEC. 8, 1919.

1,383,028. Patented June 28, 1921.

Inventor
Walter G.E. Rolaff.
by Elliott & Ammen
his Att'ys.

UNITED STATES PATENT OFFICE.

WALTER G. E. ROLAFF, OF BELLEVILLE, ILLINOIS.

PACKING-RING FOR ROTARY SHAFTS.

1,383,028. Specification of Letters Patent. Patented June 28, 1921.

Application filed December 8, 1919. Serial No. 343,208.

*To all whom it may concern:*

Be it known that I, WALTER G. E. ROLAFF, a citizen of the United States, residing in the county of St. Clair, city of Belleville, and State of Illinois, have invented new and useful Improvements in Packing-Rings for Rotary Shafts, of which the following is a specification.

This invention relates to packing rings for rotary shafts, and has for its object to provide automatic means for normally maintaining a sealing pressure between the packing ring and the head of the casing, cylinder, or other part penetrated by the shaft.

The preferred embodiment of my invention, as illustrated in the drawing, comprises a fixed member in the form of a collar mounted on the shaft, a packing ring proper surrounding the shaft and adapted to bear against the surface of the member penetrated by the shaft, such as a cylinder head, and movable wedges mounted in suitable guide-ways or slots provided in corresponding portions of the collar and ring, and operating by the action of centrifugal force to be thrown outward by the rotation of the shaft and to force the packing ring into engagement with the member penetrated by the shaft.

Figure 2:
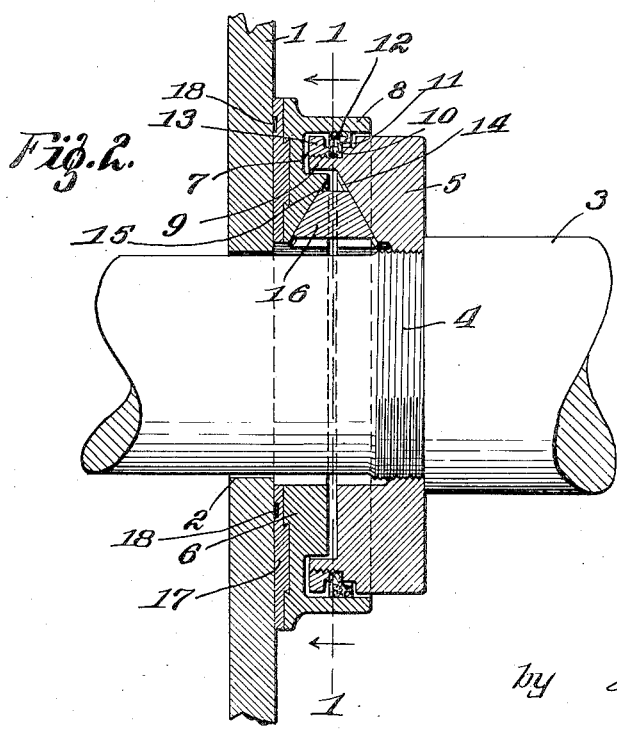

In the accompanying drawing,

Figure 1 is a cross-section through a shaft and packing ring constructed according to my invention, the view being taken on the line 1—1 of Fig. 2; and Fig. 2 is a vertical sectional view of the same, both views illustrating a portion of a head or cylinder penetrated by the shaft.

Referring now to the drawing, the numeral 1 indicates the head of a cylinder or casing which is provided with an aperture 2 forming a bearing for a rotary shaft 3. The shaft 3 is provided with screw-threads 4 on which is screwed a collar 5. The numeral 6 indicates the packing ring proper, which is in the form of an annulus surrounding the shaft 3, and is provided on its inner face with an annular recess 7 surrounded peripherally by an annular flange 8. On its outer side, the collar 5 is reduced in diameter to provide an annular flange 9 which is screw-threaded, and the collar is further cut away to provide an annular shoulder 10 and an annular recess 11. A cup-shaped washer 12 is mounted on the flange 9 and is secured in place by a ring-nut 13 screwed on the flange 9 and clamping the washer against shoulder 10. The peripheral portion of the washer 12 projects rearwardly and is received in the recess 11. Said washer is constructed of leather, or other suitable yielding material, and bears firmly against the inner wall of the flange 8. This washer, as will be seen, operates to seal the space between the collar 5 and ring 6. Below the flange 9 the collar 5 is provided on its outer face with three inwardly-inclined grooves 14, and beginning at the inner wall of the recess 7, the ring 6 is provided on its inner face with corresponding outwardly-inclined grooves 15, and slidably mounted in each set of these grooves is a wedge 16 which is substantially triangular in shape, and the base of which is next to the shaft.

These wedges are freely movable in the slideways or slots 15 and 16, and as the shaft 3 rotates, they will be thrown outwardly by the action of centrifugal force and by their wedge shape operate to press the ring 6 outwardly or toward the head 1 with greater or less force, dependent upon the speed of the rotation of the shaft 3. The packing ring 6 is provided on its outer face with an annular bearing member 17, which may be of copper, or other suitable material, and which presents a flat surface for frictionally engaging the face of the head 1.

The packing ring construction shown is primarily intended for use in rotary compressors, and as the pressure of the air, gas or other medium operated upon by the machine is proportional to the speed of rotation of the shaft 3, it will be seen that the pressure of the packing ring against the head 1 will be increased automatically as the requirements of the machine demand, by reason of the fact that the centrifugal force will operate upon the wedge 16 with greater power as the speed of the shaft increases. My improved packing ring is thus automatically compensating in its operation, forming a firmer contact with the cylinder head, and therefore a more secure sealing means, as the speed of the shaft increases, and a less firmer engagement as the speed decreases. In this way, the total frictional resistance is very greatly reduced, as under ordinary conditions it is necessary to pack the shaft to resist the highest pressure that will be exerted at the bearing. With the present construction, when the necessity for great pressure of the packing ring against the cylinder head ceases, such pressure decreases in proportion, as the demand therefore decreases, and increases only as such demand increases.

In addition to the function of forcing the packing ring 6 outwardly in the rotation of the shaft, the wedges 16 engaging in the grooves 14 and 15, operate as a connection between the collar and packing ring and force the latter to rotate with the collar.

In the present construction, I also employ an eccentric oil groove, 18 such as shown, described and claimed in a companion application filed of even date herewith.

I claim:

1. In combination with an apertured member penetrated by a revolving shaft, a collar fixedly secured on said shaft, a packing ring surrounding said aperture and bearing against the adjacent surface of said member, and movable members interposed between said packing ring and collar and adapted to be thrown outward by centrifugal force, to press the packing ring into engagement with said member.

2. In combination with an apertured member penetrated by a revolving shaft, a collar fixedly secured on said shaft and provided with tangentially-disposed inclined surfaces, a packing ring surrounding said aperture and bearing against the adjacent surface of said member and provided with tangentially-disposed inclined surfaces complementary to those of said collar, and wedges located between the inclined surfaces of said collar and packing ring and adapted to be thrown outward by centrifugal force in the rotation of the shaft to press the packing ring into engagement with said member.

3. In combination with an apertured member penetrated by a revolving shaft, a collar fixedly secured on said shaft and provided with tangentially-disposed inclined grooves, a packing ring surrounding said aperture and bearing against the adjacent surface of said member and provided with tangentially-disposed inclined grooves complementary to the grooves in said collar, and wedge-shaped devices mounted in the corresponding grooves of said collar and packing ring and adapted to be thrown outward by centrifugal force in the rotation of said shaft to press the packing ring into engagement with said member.

4. In combination with an apertured member penetrated by a revolving shaft, a collar fixedly secured on said shaft, a packing ring surrounding said aperture and bearing against the adjacent surface of said member, said packing ring and collar having annular portions housed one within the other, an annular washer interposed between said housed portions for sealing the space between said collar and packing ring, and movable members interposed between said collar and packing ring and adapted to be thrown outward by centrifugal force in the rotation of said shaft to press said packing ring against said member.

In testimony whereof, I have hereunto set my hand.

WALTER G. E. ROLAFF.